United States Patent [19]
Johnson et al.

[11] Patent Number: 5,601,951
[45] Date of Patent: Feb. 11, 1997

[54] RECHARGEABLE LITHIUM ION CELL

[75] Inventors: Arden P. Johnson, Brookline; Carl R. Schlaikjer, Concord, both of Mass.

[73] Assignee: Battery Engineering, Inc., Hyde Park, Mass.

[21] Appl. No.: 601,980

[22] Filed: Feb. 15, 1996

Related U.S. Application Data

[63] Continuation-in-part of Ser. No. 531,200, Sep. 19, 1995, abandoned.

[51] Int. Cl.$^6$ ........................................... H01M 2/02
[52] U.S. Cl. .................... 429/218; 429/101; 429/105; 429/188; 429/205
[58] Field of Search ..................... 429/101, 188, 429/218, 105, 205

[56] References Cited

U.S. PATENT DOCUMENTS 4,180,444  12/1979  Merkl ........................................ 204/90

*Primary Examiner*—M. Nuzzolillo
*Attorney, Agent, or Firm*— Shlesinger, Arkwright & Garvey

[57] ABSTRACT

An inorganic electrolyte rechargeable electrical storage cell is shown which makes use of non-metallic electrodes in combination with an inorganic electrolyte that includes sulfur dioxide. The electrolyte can be for example a lithium and/or a calcium tetrachloroaluminate salt in sulfur dioxide. The anode of the cell is made of a carbon for example a graphite while the cathode is produced from a carbon having a relatively much higher surface area.

22 Claims, 4 Drawing Sheets

RECHARGEABLE LITHIUM ION CELL

This application is a CIP of Ser. No. 08/531,200, filed on Sep. 19, 1995, now abandoned.

This invention relates in general to the use of carbon electrodes in ambient temperature electrochemical power cells in combination with an inorganic electrolyte in a rechargeable cell where the electrolyte is a solution of an alkali metal or an alkaline earth tetrachloroaluminate salt with sulfur dioxide, the positive electrode is a carbon, and the negative electrode is a carbon which is capable of incorporating lithium ions by intercalation. The lithium/sulfur dioxide cell here shown is an example of a soluble positive electrode system, in which the solvent also acts as the positive depolarizer and is reduced during discharge.

BACKGROUND

In the past, rechargeable electrochemical cells have been shown wherein pure lithium metal anodes together with porous carbon cathodes have been made which make use of a lithium tetrachloroaluminate electrolyte salt dissolved in liquid sulfur dioxide. Such cells have been called a soluble positive electrode system because the solvent also acts as the active cathode depolarizer and is electrochemically reduced during discharge. This reduction takes place at the surface of the porous carbon electrode. Satisfactory performance may be obtained with carbons such as acetylene black, which has a specific surface area of between 60 and 70 $m^2/g$ (as determined by the Brunauer-Emmett-Teller technique of nitrogen gas adsorption). Superior performance is obtained when the carbon electrode includes a mixture of acetylene black with typically 10% or more of a carbon such as a furnace black with a specific surface area between 800 and 1000 $m^2/g$. One example of such a carbon is Ketjenblack®, made by Akzo Nobel of Charlotte, N.C.

Cells of this type have a long shelf life and high volumetric and gravimetric energy density, are relatively inexpensive and use readily available active materials, include a highly conductive electrolyte, and tend to resist damage due to overcharging. Despite these desirable features, however, such cells have not met with any significant commercial success. Even though various attempts have been made to improve the overall performance of such cells, it has been found that during charging, metallic dendrites can grow from the negative lithium electrode. If these make contact with the cathode or the cell hardware, the resulting short circuit can in some cases cause the cell to explode with great violence.

Rechargeable lithium organic electrolyte cells with metal oxide positive electrodes have also been proposed in the past in which the negative electrode is not lithium metal but is lithium sequestered by intercalation into a suitable carbon material. In this structure the electrolyte is usually a mixture of carbonate esters and the positive electrode is a lithiated transition metal oxide such as $LiCoO_2$ or $LiNiO_2$ which on electrochemical oxidation during the charging cycle releases lithium ions to the electrolyte. In such cells, these lithium ions migrate to the negative electrode and intercalate between layers in the carbon structure. In such a cell, as long as the potential of the carbon remains anodic to the lithium potential, metallic lithium is never deposited on the anode, and no dendrites can be formed. The lithiation and delithiation of both the carbon and metal oxide in these cells show excellent reversibility, and cells containing such electrodes have a very long cycle life. Very strict control of the charging potential is required to preclude the deposition of dendritic metallic lithium on the surface of the negative electrode during any overcharging period.

Many different types of carbon have been shown to accept lithium ions by intercalation during charging by electrochemical reduction. Examples include carbons with highly ordered structures such as graphites, highly disordered carbons prepared by decomposition of solid organic precursors, and carbons of intermediate structure such as cokes. In every case, more charge is consumed during the first charging of the carbon negative electrode than is returned in the first discharge process. After this first charge and discharge cycle, the capacities of subsequent charge and discharge cycles are more nearly equal; that is, lithium ions intercalate into and deintercalate from the carbon reversibly. The excess charge which is consumed in the first charge process is referred to as the irreversible capacity of the carbon. The excess charge is thought to be consumed in irreversible reduction of components of the electrolyte to form an insoluble film of salts on the surface of the carbon.

While a salt film of this type is thought to be desirable for preventing further reaction between the electrolyte and the negative electrode, active cell material, usually from the positive electrode, is irreversibly consumed in its formation. One way to decrease this loss of active material is to minimize the area over which the film is formed. Although there is no exact correlation between the specific surface area of the carbon and its irreversible capacity, it is generally preferable to use a carbon which has a specific surface area of 50 $m^2/g$ or less.

The use of inorganic additives dissolved in organic electrolytes for forming protective coatings on carbon negative electrodes has been proposed previously. Studies also suggest that carbon electrodes that have first been treated in an organic electrolyte with such film-forming additives can then be used in inorganic electrolytes. But to date no specific battery system has been designed by which lithium ions could be introduced into such a coated carbon negative electrode. The stability of sulfur dioxide as an electrolyte solvent in systems using a lithiated metal oxide such as $LiCoO_2$ has been noted, but in a system with such a cathode the sulfur dioxide serves only as an electrolyte solvent, not as an oxidant, cathode depolarizer, or positive electrode material.

It is obvious that sulfur dioxide itself cannot act as a source of lithium ions, therefore if sulfur dioxide is to be used as a soluble positive in a cell with a lithium intercalating negative electrode, it is necessary to provide a separate source of lithium ions from which the negative electrode can be charged. The source of lithium ions conventionally used with carbon negative electrodes in organic electrolyte cells is the high voltage lithiated metal oxides. As noted above, if used in the sulfur dioxide electrolyte system, these metal oxides would themselves act as the positive redox material. If a carbon anode is to be used as taught herein, lithium ions must be introduced into a carbon negative electrode from a sacrificial electrode; the present invention uses such an innovation to exploit both the excellent electrochemical reversibility of the sulfur dioxide electrolyte and the excellent safety characteristics of carbon negative electrodes. The nonmetallic negative electrode provides safety not possible with a metallic lithium negative electrode.

BRIEF DESCRIPTION OF THIS INVENTION

The ambient temperature rechargeable electrochemical cell here shown takes the form of a cell having a carbon negative electrode and a carbon positive electrode together with an electrolyte salt or salts dissolved in sulfur dioxide. The cell is preferably constructed with a negative electrode of a carbon with a specific surface area of between 1.26 $m^2/g$ and less than 50 $m^2/g$ and a suitable binder; a positive electrode of a carbon with a specific surface area greater than 50 $m^2/g$ and as much as 3,000 $m^2/g$ together with a suitable binder; and an electrolyte formed by dissolving an alkali metal salt or alkaline earth salt or a mixture of such salts in sulfur dioxide. Since neither the anode nor the cathode initially contains any active metal ions, such ions must be introduced into the electrodes by electrochemical means from a lithium metal source.

One such method of providing the required metal ions for the carbon electrodes is by inserting a sacrificial third electrode of metallic lithium into the cell between the carbon negative and the carbon positive electrodes. When this third electrode is connected to either of the carbon electrodes through an external circuit, the third electrode acts as an anode for transfer of lithium ions by electrochemical oxidation of the lithium metal. Once the initial charging of either of the carbon electrodes or of both has been completed, the third electrode may be disconnected, and the cell may be usefully charged and discharged between its positive and negative carbon electrodes.

Another method for introducing the required metal ions into the carbon negative electrode and the carbon positive electrode consists of placing one or more sacrificial lithium foil electrodes between the corresponding carbon positive and carbon negative electrode sections, but with electrical connections neither between these sacrificial electrodes, nor between the sacrificial electrodes and any external lead. When the cell is subjected to a charge cycle by connecting electrical leads to its carbon negative and its carbon positive electrode, lithium is transferred from the sacrificial electrodes to the negative carbon electrode from the side of the sacrificial electrodes which face the carbon negative electrode. Lithium from the lithium electrolyte salt is electrochemically deposited on the side of the sacrificial electrodes facing the carbon positive electrode, but at the same time chlorine and aluminum chloride are generated at the positive electrode, and these species migrate to the side of the sacrificial electrodes facing the positive electrode and corrode the lithium to form lithium tetrachloroaluminate.

The amount of lithium metal initially present in the cell may be chosen such that it is all consumed during the charging of the carbon electrodes. The amount may alternatively be chosen such that it is in excess of the amount to be transferred to the carbon electrodes in the first cycle. The lithium metal which is not transferred in the initial cycle may then act as a reservoir of active material for maintaining the cell capacity in later cycling.

The herein described construction provides a rechargeable sulfur dioxide cell wherein a carbon negative electrode is used that is capable of storing lithium in intercalated form in a manner which precludes the possibility of lithium dendrites growing from the negative electrode during charging, to cause a short circuit or even worse a violent explosion, which has happened in the cycling of prior art cells in which lithium metal negative electrodes have been used.

IN THE DRAWINGS

DETAILED DESCRIPTION

Figure 1:
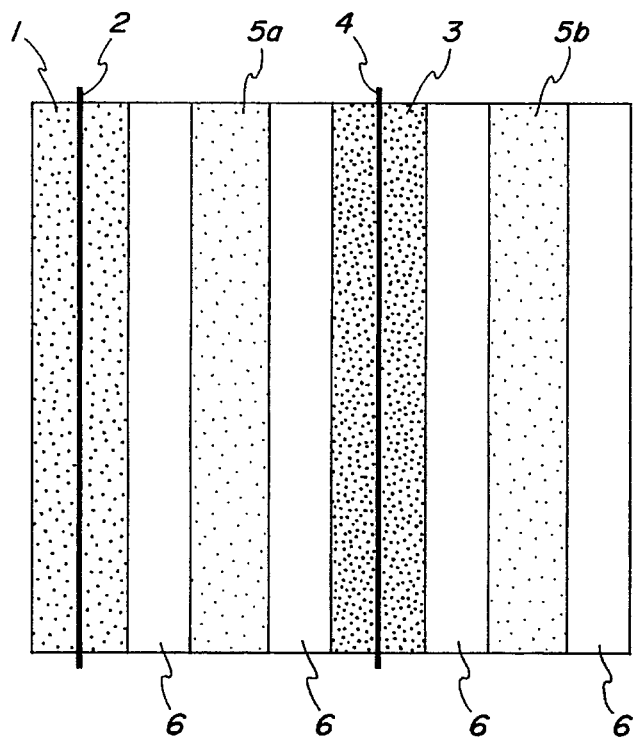
FIG. 1 is a diagrammatic representation of one form of a positive carbon and a negative carbon electrode useful for this invention.

A typical cell of this invention is shown in the drawings. In FIG. 1 a positive electrode assembly 1 is made up of a mixture of a carbon with a specific surface area greater than 50 $m^2/g$ and as much as 3,000 $m^2/g$ as measured by the BET nitrogen gas adsorption method and a binder mounted on a metal current collector 2. The negative electrode assembly 3 is constructed with a mixture of a carbon with a specific surface area of from 1.26 $m^2/g$ and less than 50 $m^2/g$ and a binder mounted on a metal current collector 4. A third electrode made of lithium metal 5a is supported between these negative and positive electrodes with separators 6 made of nonwoven glass fabric or a microporous ethylene/tetrafluoroethylene copolymer placed between each of the positive and negative electrodes and the lithium electrode 5a. Alternatively, an additional lithium electrode 5b may be included.

Figure 2:
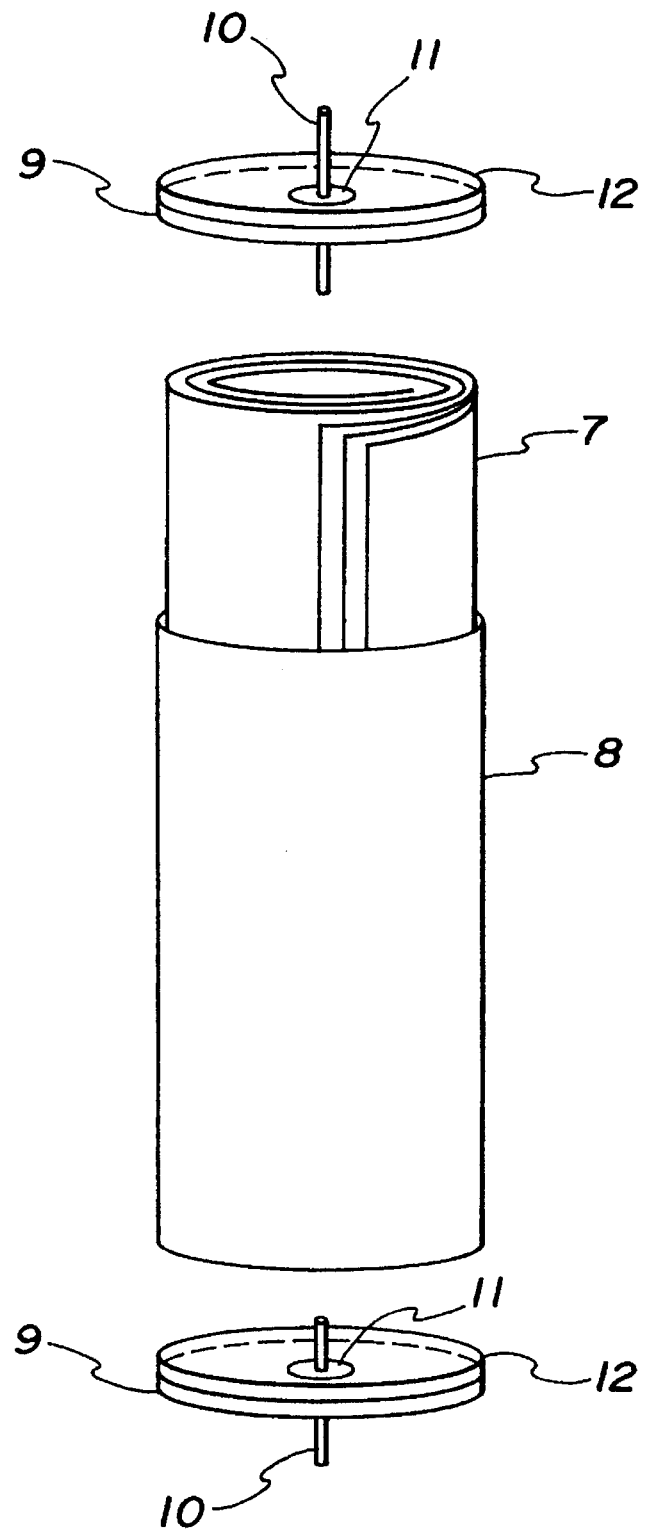
FIG. 2 shows the assembly of a FIG. 1 electrode assembly in a typical battery casing.

Referring to FIG. 2 this electrode assembly wound as shown in a spiral configuration 7 is inserted into a cylindrical cell case 8. The cell casing is covered at each end with cap assemblies. Each cap assembly includes a metal cap 9 and a centrally disposed fill tube 10 which is electrically insulated from its respective cap and from the cell case by a glass-to-metal insulating seal 11. The negative electrode 3 may have its current collector 4 electrically connected by a metal lead not shown to the casing and the current collector 2 of the positive electrode may likewise be connected by a metal lead not shown to one of the fill tubes 10 or both of the current collectors can be connected one to each of the respective fill tubes 10.

After the spiral assembly has been inserted into the casing and the connections to the battery's external positive and negative leads have been made, the cell caps are each welded to the cell casing and after one of the fill tubes is sealed shut, the electrolyte is introduced into the cell through the other tube and then that tube is sealed.

It is obvious that the electrode and casing assembly described above can be assembled in any other conventionally known geometric battery form as for example in a prismatic cell with flat electrodes.

In one example of a cell constructed in accordance with this invention, a positive electrode was made by pressing a mixture of three parts acetylene black and one part Ketjenblack® having a specific surface area of 950 $m^2/g$ and 10 weight percent polytetrafluoroethylene binder onto a current collector made of aluminum expanded metal screen. A negative electrode was constructed analogously of Lonza KS-15 graphite with a specific surface area of about 12 $m^2/g$ obtained from Lonza, Fair Lawn, N.J., and three weight percent of the same binder pressed onto a current collector of nickel expanded metal screen. These electrode elements were trimmed to a size of approximately 5.7 cm ×2.5 cm. Nickel tabs were attached to the current collector screens of each of the electrodes. A sacrificial electrode in the form of a lithium metal foil 0.0254 cm thick also having a nickel tab attached thereto was placed between the cathode and anode and was separated from them on each side by a sheet of non-woven glass fabric. This assembly was wound into a spiral and then inserted into a 304 stainless steel tube the size of an AA battery, i.e., 14 mm ×48 mm. The tab from the sacrificial lithium metal electrode was welded to the casing 8 while the tabs from the carbon positive and negative electrodes were welded one each to the fill tubes at the opposite ends of the cell. Disks of fluorinated ethylene propylene copolymer 12 were placed between the internal components and the cell caps, and then the caps were welded to the casing and one of the fill tubes was welded shut. The cell was then filled with the sulfur dioxide and salt solution and then that fill tube was also sealed. The $2LiCl \cdot CaCl_2 \cdot 4AlCl_3 \cdot 12SO_2$ electrolyte solution was prepared by refluxing the appropriate stoichiometric quantities of $LiCl$, $CaCl_2$ and $AlCl_3$ in distilled $SO_2Cl_2$ for 6 hours and then boiling off the sulfuryl chloride. Sulfur dioxide gas was allowed to flow over this dried salt mixture until no more $SO_2$ was absorbed. A clear solution was obtained.

Electrical leads were then connected to the cell case and to the sealed fill tubes, which then served as the electrical connections to the contents within the cell. Lithium ions were then introduced into the carbon electrodes by running a constant current of 20 mA between the sacrificial lithium electrode and the carbon positive electrode to a cut-off potential of 2.0 V, and then running a constant current of 20 mA between the lithium electrode and the carbon negative electrode to a cut-off potential of 0.5 V. The sacrificial lithium electrode was then electrically disconnected.

Cycling was then started between the carbon electrodes, beginning with a charging cycle from the carbon positive to the carbon negative. The cell was charged and discharged at a constant current of 20 mA between potential limits of 4.0 V and 1.0 V. The cycling was performed using a computer-controlled power supply with automated data collection.

Figure 3:
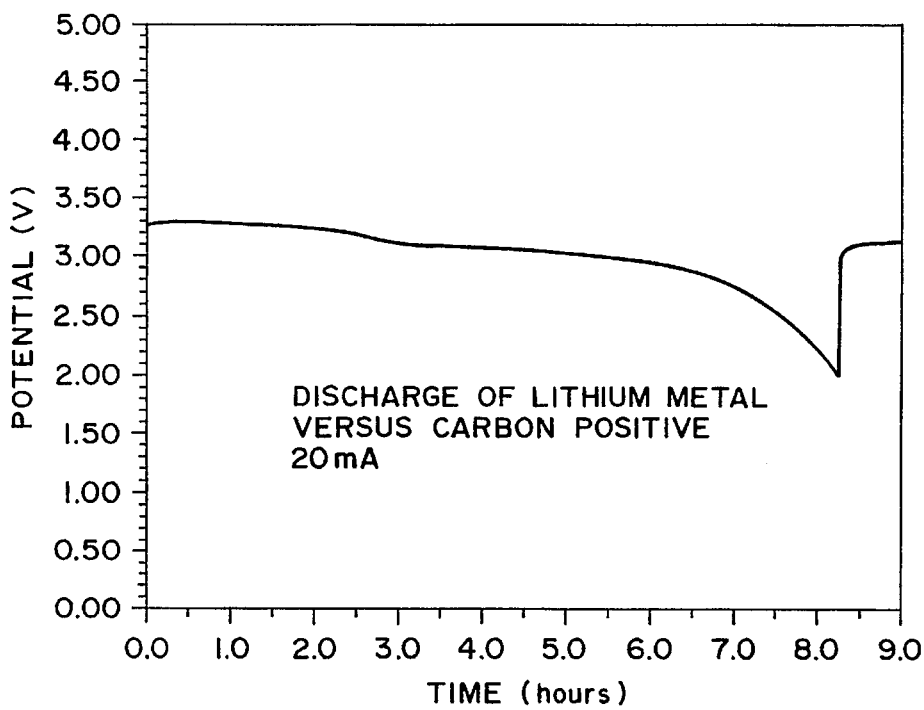
FIG. 3 is a curve that shows the discharge of lithium metal versus the carbon positive electrode.
Figure 4:
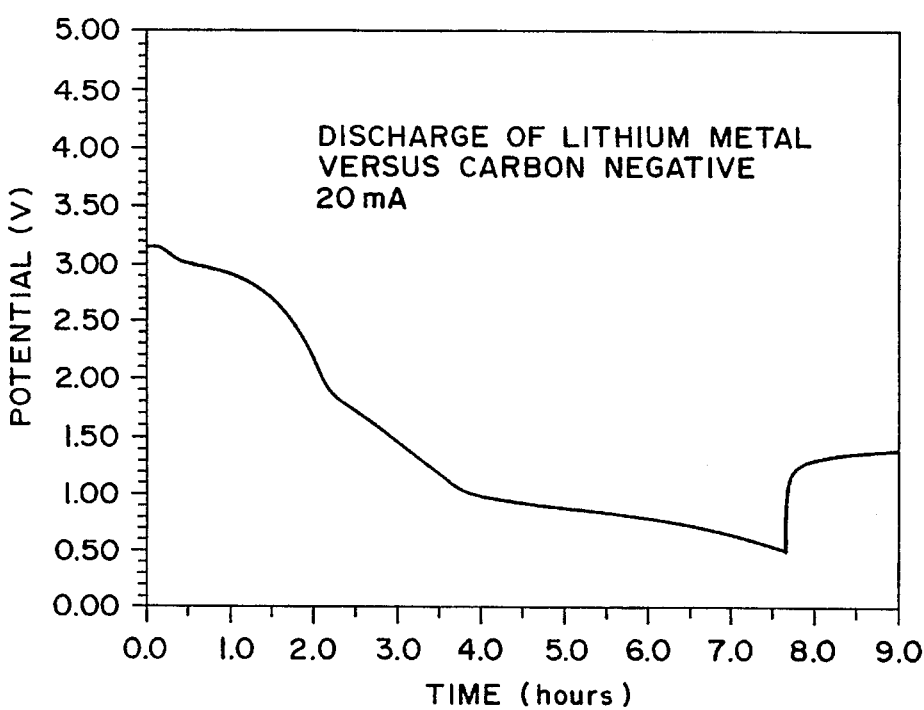
FIG. 4 is a curve that shows the discharge of lithium metal for the intercalation of the carbon negative electrode.

FIGS. 3 and 4 show potential vs. time curves for the discharge of the lithium against the carbon positive and the charging of the carbon negative from the lithium metal. Much of the latter curve may be seen to involve processes which take place below about 2 V vs. Li, and which may be understood as involving the intercalation of lithium ions into the carbon structure. This test cell was constructed with an excess of lithium metal; after these two initial transfer cycles, approximately 100 mAh of unreacted lithium metal remained in the cell.

Figure 5:
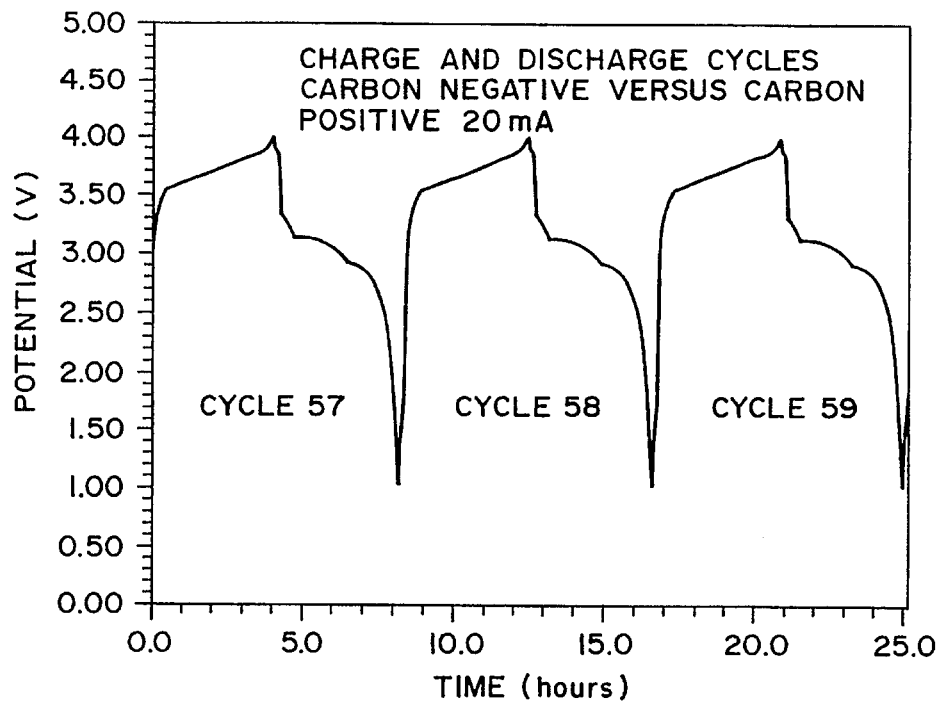
FIG. 5 shows the typical cycling behavior between the carbon negative and the carbon positive after the charging of the electrodes has been completed for cycles number 57, 58 and 59 of a test cell.
Figure 6:
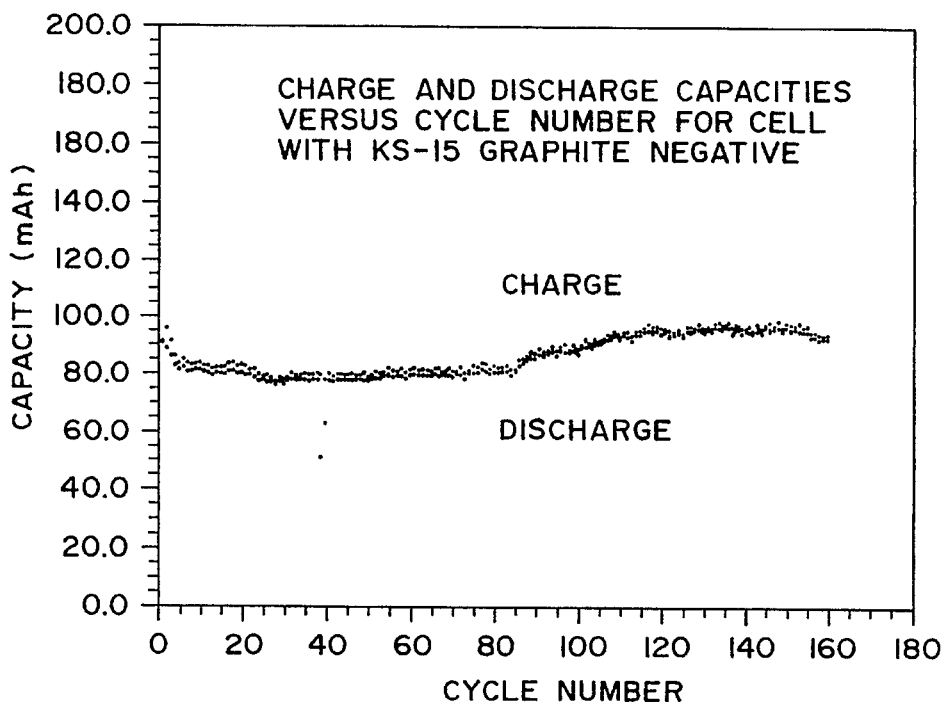
FIG. 6 shows the charge and discharge capacities in mAh of a test cell with a graphite negative electrode for a number of cycles.

FIG. 5 shows typical cycling behavior between the carbon negative and the carbon positive electrodes after the lithium electrode has been electrically disconnected; cycles 57, 58, and 59 are depicted. FIG. 6 shows the charge and discharge capacities in milliampere hours as a function of cycle number. The plot demonstrates the safe operation and very long cycle life of the rechargeable sulfur dioxide cell with a carbon negative electrode.

It may be seen in FIG. 5 that the charge and discharge capacities of this cell were not merely constant but continued to increase as the cell was cycled. The only available source of additional lithium ions for the carbon electrodes was the unreacted lithium metal remaining in the sacrificial lithium electrode. This increase in capacity could only have come from the transfer of active material from the sacrificial third electrode which is not electrically connected to the cell circuit.

Figure 7:
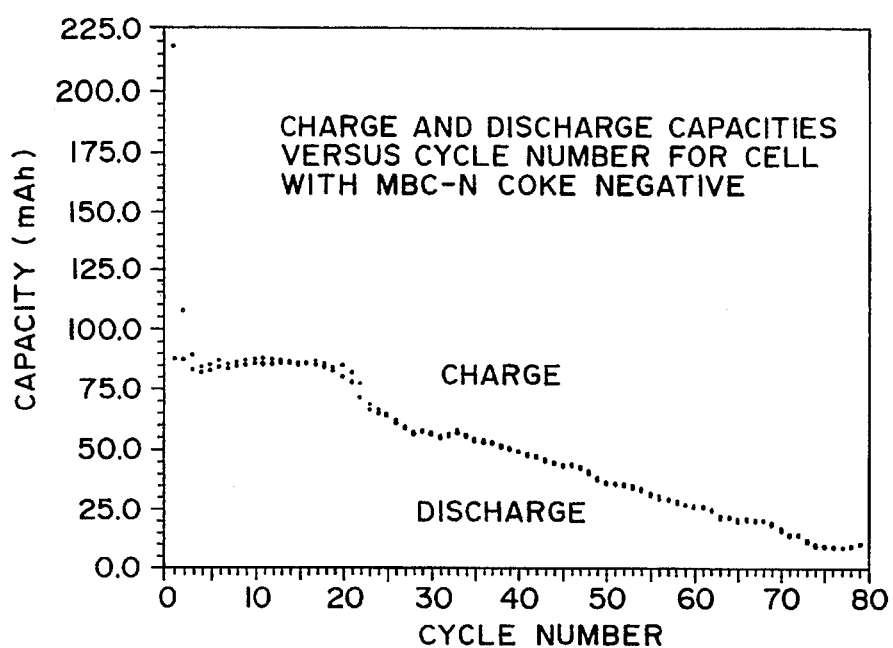
FIG. 7 shows the charge and discharge capacities in mAh versus cycle number for a cell with a coke negative electrode.

In a second test cell, the carbon for the negative electrode contained a variety of coke rather than graphite. A mixture of Mitsubishi MBC-N, a coke with a specific surface area of 3.5 $m^2/g$, obtained from Mitsubishi, Tokyo, Japan, and 3 weight percent polytetrafluoroethylene binder was pressed onto a current collector of nickel screen. This assembly was then used as the carbon negative electrode in a test cell which was constructed as above described. After initial charging of the carbon electrodes from a lithium electrode, the carbon electrodes were charged and discharged at a constant current of 20 mA between potential limits of 4.0 V and 1.0 V as in the first example. While the cell capacity was initially steady, the capacity gradually began to fade, and the cycling was stopped after 79 cycles. FIG. 7 shows the charge and discharge capacities in milliampere hours as a function of cycle number for this cell.

It is submitted that the herein described specific examples of the observed reversible intercalation of lithium ions into the described graphite and coke electrodes together with the sulfur dioxide electrolyte will also suggest to those skilled in the art other examples of carbon electrodes for use with a sulfur dioxide electrolyte that may fall within the scope of the following claims.

We claim:

1. In a soluble positive electrode rechargeable electrochemical cell the combination of a positive electrode formed of carbon and a binder, a negative electrode formed also of carbon and a binder, an electrolyte salt dissolved in sulfur dioxide, and the carbon of said positive electrode having a larger specific surface area than the specific surface area of the carbon in said negative electrode.

2. An electrochemical cell as in claim 1 wherein said positive electrode is carbon having a specific surface area with a range of from 50 $m^2/g$ to as much as 3,000 $m^2/g$ as measured by the BET nitrogen gas adsorption method and said negative electrode is a carbon with a specific surface area within a range of from 1.26 $m^2/g$ and less than 50 $m^2/g$ as measured by said BET nitrogen gas adsorption method.

3. An electrochemical cell as in claim 1 wherein said positive electrode has a carbon with a specific surface area of 950 $m^2/g$ and said negative electrode has a specific surface area of 12 $m^2/g$, both of said specific surface areas being measured by the BET nitrogen gas adsorption method.

4. A cell as in claim 1 wherein the cell includes a sacrificial lithium electrode, said sacrificial electrode being positioned between said positive and negative electrodes, said sacrificial electrode being electrically connected to one of said electrodes through an external circuit to act as an anode for transferring lithium ions to said electrode to which it is connected to initially charge said connected electrode with lithium ions, and said sacrificial electrode being electrically disconnected from said one electrode during the subsequent charging and discharging cycling of the battery during its normal usage.

5. A cell as in claim 4 wherein said sacrificial electrode is electrically connected first to said one electrode during said initial charging cycle and is then adapted to be connected to the other of said electrodes during the remainder of said initial charging cycle whereby to charge said other electrode with lithium ions and said sacrificial electrode being electrically disconnected from said other electrode during any subsequent charging and discharging cycling of the battery during normal use.

6. A cell as in claim 5 wherein said sacrificial electrode is positioned between said one and said other electrode in said battery.

7. A cell as in claim 5 wherein said electrodes and said sacrificial electrode is an assembly that is wound in a spiral with the sacrificial electrode positioned between said one and said other electrode.

8. A cell as in claim 4 wherein said sacrificial electrode is a sheet of lithium metal.

9. A cell as in claim 5 wherein said sacrificial electrode is a sheet of lithium metal.

10. A cell as in claim 1 having an electrolyte solution therein including a sulfur dioxide solvent for a lithium salt and having sacrificial lithium metal electrode means positioned between said carbon positive and said carbon negative electrodes so that when said cell is subjected to a charge cycle when electrical leads are connected to said negative and positive electrodes lithium ions are transferred from said sacrificial electrode to the negative electrode from the sacrificial electrode, and to said positive electrode from said sacrificial electrode.

11. A lithium/sulfur dioxide rechargeable cell comprising a cell having a carbon in a binder forming a positive electrode and a carbon in a binder forming a negative electrode and in which said sulfur dioxide acts as the active electrode depolarizer and is reduced during discharge, an electrolyte lithium salt dissolved in said sulfur dioxide selected from a group consisting of a lithium metal salt, and a mixture of a lithium metal salt and an alkaline earth metal salt, and a sacrificial lithium metal electrode positioned between said carbon electrodes adapted to provide active metal lithium ions for incorporation into at least one of said carbon electrodes.

12. A cell as in claim 11 wherein said positive electrode is formed of a mixture of acetylene black and carbon black having a specific surface area of between 800 and 1,000 $m^2/g$ as measured by the BET nitrogen gas adsorption method.

13. A cell as in claim 11 wherein said negative electrode is formed of graphite having a specific surface area of less than 50 $m^2/g$ as measured by the BET nitrogen gas adsorption method.

14. A cell as in claim 11 wherein said negative electrode is formed of coke.

15. A cell as in claim 11 wherein said positive electrode is formed of a mixture of acetylene black with furnace black having a specific surface area greater than 50 $m^2/g$ and as much as 3,000 $m^2/g$, and a negative electrode of carbon having a specific surface area of between 1.26 and 50 $m^2/g$ as determined by the BET nitrogen gas adsorption method.

16. A cell as in claim 11 wherein said positive electrode is formed of a carbon having a specific surface area of 950 $m^2/g$ and said negative electrode has a specific surface area of 12 $m^2/g$, both of said surface areas being measured by the BET nitrogen gas adsorption method.

17. A cell as in claim 11 wherein said sacrificial lithium electrode is positioned between said positive and negative electrodes, said sacrificial electrode being electrically connected to one of said electrodes through an external circuit to act as an anode for transferring lithium ions to said electrode to which it is connected to initially charge said connected electrode with lithium ions, and said sacrificial electrode being electrically disconnected from said one electrode during the subsequent charging and discharging cycling of the cell during its normal usage.

18. A cell as in claim 11 wherein said sacrificial electrode is first connected to said one electrode and then to the other of said electrodes for initially transferring lithium ions respectively to the electrode to which it has been connected, and said sacrificial electrode being then disconnected from said electrodes during the subsequent charging and discharging cycling of the cell during normal use.

19. A cell as in claim 18 wherein said sacrificial electrode is positioned between said one and the other of said electrodes.

20. A cell as in claim 18 wherein said sacrificial electrode and said one and said other electrode are wound in a spiral with the sacrificial electrode positioned between said one and said other electrode.

21. A cell as in claim 19 wherein said sacrificial electrode is a sheet of lithium metal.

22. A cell as in claim 20 wherein said sacrificial electrode is a sheet of lithium metal.

* * * * *